(12) United States Patent
Sato et al.

(10) Patent No.: US 11,268,577 B2
(45) Date of Patent: Mar. 8, 2022

(54) VEHICLE CAM DAMPER STRUCTURE

(71) Applicant: HONDA MOTOR CO., LTD., Tokyo (JP)

(72) Inventors: Koji Sato, Wako (JP); Akio Handa, Wako (JP); Keita Yagi, Wako (JP); Dai Arai, Wako (JP); Eiichi Suzuki, Wako (JP); Takeyuki Kariyasu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 272 days.

(21) Appl. No.: 16/575,695

(22) Filed: Sep. 19, 2019

(65) Prior Publication Data

US 2020/0102988 A1   Apr. 2, 2020

(30) Foreign Application Priority Data

Sep. 28, 2018   (JP) .............................. JP2018-185047

(51) Int. Cl.
*F16D 3/12* (2006.01)
*F16D 3/06* (2006.01)
*F16D 3/10* (2006.01)

(52) U.S. Cl.
CPC ................. *F16D 3/12* (2013.01); *F16D 3/06* (2013.01); *F16D 3/10* (2013.01); *F16F 2230/0064* (2013.01); *Y10T 74/2101* (2015.01)

(58) Field of Classification Search
CPC ..... F16D 3/12; F16D 3/10; F16D 3/06; Y10T 74/2101; F16F 2230/0064; F16F 15/123
USPC .................................................. 464/161, 39
See application file for complete search history.

(56) References Cited

U.S. PATENT DOCUMENTS

| 2,560,427 A | * | 7/1951 | Foss ......................... F16D 7/044 |
| 2,911,803 A | * | 11/1959 | Weasler .................. F16D 3/841 |
| | | | 464/39 |
| 10,393,188 B2 | * | 8/2019 | Fujimoto ................ F16H 35/10 |

FOREIGN PATENT DOCUMENTS

| GB | 827591 | * 2/1960 | ..................... 464/39 |
| JP | S60-30819 U | 3/1985 | |
| JP | 60-099728 | 6/1985 | |
| JP | H6-147264 A | 5/1994 | |

(Continued)

OTHER PUBLICATIONS

Japanese Office Action with English translation dated Nov. 10, 2020, 9 pages.

(Continued)

*Primary Examiner* — Greg Binda
(74) *Attorney, Agent, or Firm* — Rankin, Hill & Clark LLP

(57) ABSTRACT

In a vehicle cam damper structure, a drive shaft includes a cam damper at a midway portion thereof. The cam damper integrates a cam reception portion with a cam via a shaft member. The cam reception portion is connected relatively rotatably with the shaft member. The cam and the shaft member, while being integrally rotatable, are connected with each other axially slidably. The shaft member includes an enlarged-diameter portion. An elastic member that presses the cam toward a side of the cam reception portion is disposed between the enlarged-diameter portion and the cam. An outer cylinder extends across the cam reception portion and the shaft member. A drive-side shaft and a driven-side shaft of the drive shaft are each connected with corresponding one of the cam reception portion and the shaft member.

8 Claims, 11 Drawing Sheets

(56) References Cited

FOREIGN PATENT DOCUMENTS

JP  2017-219085 A  12/2017

OTHER PUBLICATIONS

Japanese Office Action with English Translation dated Aug. 4, 2020, 7 pages.

* cited by examiner

VEHICLE CAM DAMPER STRUCTURE

INCORPORATION BY REFERENCE

The present application claims priority under 35 U.S.C. § 119 to Japanese Patent Application No. 2018-185047 filed on Sep. 28, 2018. The content of the application is incorporated herein by reference in its entirety.

TECHNICAL FIELD

The present invention relates to a vehicle cam damper structure.

BACKGROUND ART

A hitherto known structure includes a cam damper disposed on a drive shaft (see, for example, Patent Document 1). Patent Document 1 discloses a configuration in which a cam damper is disposed on a final gear shaft.

PRIOR ART DOCUMENT

Patent Document

[Patent Document 1]
Japanese Patent Laid-open No. Sho 60-099728.

SUMMARY OF THE INVENTION

Problem to be Solved by the Invention

A drive shaft may be connected via a universal joint and a need has existed for a structure that freely disposes the cam damper on the drive shaft.

The present invention has been made in view of the foregoing situation and it is an object of the present invention to provide a vehicle cam damper structure that enables a cam damper to be disposed on a drive shaft compactly and with degrees of freedom.

Means for Solving the Problem

To achieve the foregoing object, an aspect of the present invention provides a vehicle cam damper structure in a vehicle that transmits a driving force of an engine (14) to a drive wheel (12) via a drive shaft (93) that connects between the engine (14) and the drive wheel (12). The vehicle cam damper structure includes: a cam damper (110) disposed at a midway portion of the drive shaft (93). The cam damper (110) includes: a cam reception portion (140), a cam (130), a shaft member (120), an elastic member (150), and an outer cylinder (160). In the vehicle cam damper structure, the cam damper (110) integrates the cam reception portion (140) with the cam (130) via the shaft member (120), the cam reception portion (140) is connected relatively rotatably with the shaft member (120), the cam (130) is connected with the shaft member (120) integrally rotatably and axially slidably, the shaft member (120) includes an enlarged-diameter portion (126), the elastic member (150) that presses the cam (130) toward a side of the cam reception portion (140) is disposed between the enlarged-diameter portion (126) and the cam (130), the outer cylinder (160) is disposed across the cam reception portion (140) and the shaft member (120), and a drive-side shaft (93A) and a driven-side shaft (95A) of the drive shaft (93) are each connected with corresponding one of the cam reception portion (140) and the shaft member (120).

In the foregoing configuration, preferably, the cam reception portion (140) and the shaft member (120) each include an engagement portion (142, 121) disposed at an end portion thereof, the engagement portion (142, 121) being to be connected with the drive-side shaft (93A) or the driven-side shaft (95A).

In the foregoing configuration, preferably, the engagement portion (142, 121) has a cylindrical shape covering an outer periphery of the drive-side shaft (93A) or the driven-side shaft (95A), and the engagement portion (142, 121) has a spline (142A, 121A) formed in an inner peripheral surface.

In the foregoing configuration, preferably, the outer cylinder (160) includes an extension portion (161) at a first end thereof, the extension portion (161) extending beyond the enlarged-diameter portion (126) of the shaft member (120), the outer cylinder (160) includes a protrusion (164) on an inner peripheral surface thereof, the protrusion (164) abutting on a first side of the enlarged-diameter portion (126) in a containing space (160A), the outer cylinder (160) further has a recessed groove (163) in a second side of the enlarged-diameter portion (126), an engagement member (174) being to be engaged with the recessed groove (163), and the outer cylinder (160) is positioned with respect to the enlarged-diameter portion (126) of the shaft member (120) by the protrusion (164) and the engagement member (174).

In the foregoing configuration, preferably, the enlarged-diameter portion (126) has a reception portion (127), against which the protrusion (164) abuts in a circumferential direction.

In the foregoing configuration, preferably, the enlarged-diameter portion (126) has a recessed groove (128) formed in an outer peripheral surface, and a sealing member (177) is disposed between the outer cylinder (160) and the outer peripheral surface.

In the foregoing configuration, preferably, the cam reception portion (140) includes an enlarged-diameter portion (148) that faces an end portion of the outer cylinder (160), and a sealing member (176) and a collar member (175) are disposed between an outer periphery of the cam reception portion (140) and the inner peripheral surface of the outer cylinder (160).

Effects of the Invention

In the vehicle cam damper structure in a vehicle, the vehicle cam damper structure transmits the driving force of the engine to the drive wheel via the drive shaft, the drive shaft connects between the engine and the drive wheel and includes the cam damper at a midway portion thereof, the cam damper integrates the cam reception portion with the cam via the shaft member, the cam reception portion is connected relatively rotatably with the shaft member, the cam is connected with the shaft member integrally rotatably and axially slidably, the shaft member includes the enlarged-diameter portion, the elastic member that presses the cam toward the side of the cam reception portion is disposed between the enlarged-diameter portion and the cam, the outer cylinder is disposed across the cam reception portion and the shaft member, and the drive-side shaft and the driven-side shaft of the drive shaft are each connected with corresponding one of the cam reception portion and the shaft member. Through the foregoing configuration, the cam damper is independent as a unit and can be disposed at any place in the drive shaft. Additionally, the cam damper, because of being configured to have either end connectable with the drive-side shaft and the drive-side shaft, can be applied to any vehicle model.

In the foregoing configuration, preferably, the cam reception portion and the shaft member each include the engagement portion disposed at the end portion thereof, the engagement portion being to be connected with the drive-side shaft or the driven-side shaft. Through the foregoing configuration, connection with the drive-side shaft or the driven-side shaft can be made through a simple structure. Additionally, the drive-side shaft and the driven-side shaft, which are to be connected, require only connection machining identical to existing machining.

In the foregoing configuration, preferably, the engagement portion has a cylindrical shape covering the outer periphery of the drive-side shaft or the driven-side shaft, and the engagement portion has a spline formed in the inner peripheral surface. Through the foregoing configuration, connection with the drive-side shaft or the driven-side shaft can be made through a simple structure. Additionally, the drive-side shaft and the driven-side shaft, which are to be connected, require only connection machining identical to existing machining.

In the foregoing configuration, preferably, the outer cylinder includes the extension portion at the first end thereof, the extension portion extending beyond the enlarged-diameter portion of the shaft member, the outer cylinder includes the protrusion on the inner peripheral surface thereof, the protrusion abutting on the first side of the enlarged-diameter portion in the containing space, the outer cylinder further includes the recessed groove in the second side of the enlarged-diameter portion, the engagement member being to be engaged with the recessed groove, and the outer cylinder is positioned with respect to the enlarged-diameter portion of the shaft member by the protrusion and the engagement member. Through the foregoing configuration, the outer cylinder can be simply configured and supported on the drive-side shaft.

In the foregoing configuration, preferably, the enlarged-diameter portion has the reception portion, against which the protrusion abuts in a circumferential direction. Through the foregoing configuration, the outer cylinder can be restricted from rotating with respect to the shaft member.

In the foregoing configuration, preferably, the enlarged-diameter portion has the recessed groove formed in the outer peripheral surface, and the sealing member is disposed between the outer cylinder and the outer peripheral surface. Through the foregoing configuration, the containing space in the outer cylinder can be maintained airtight.

In the foregoing configuration, preferably, the cam reception portion includes the enlarged-diameter portion that faces the end portion of the outer cylinder, and the sealing member and the collar member are disposed between the outer periphery of the cam reception portion and an inner peripheral surface of the outer cylinder. Through the foregoing configuration, the collar member can be positioned and airtightness can be achieved while relative rotation is being permitted with respect to the outer cylinder.

MODE FOR CARRYING OUT THE INVENTION

Figure 1:
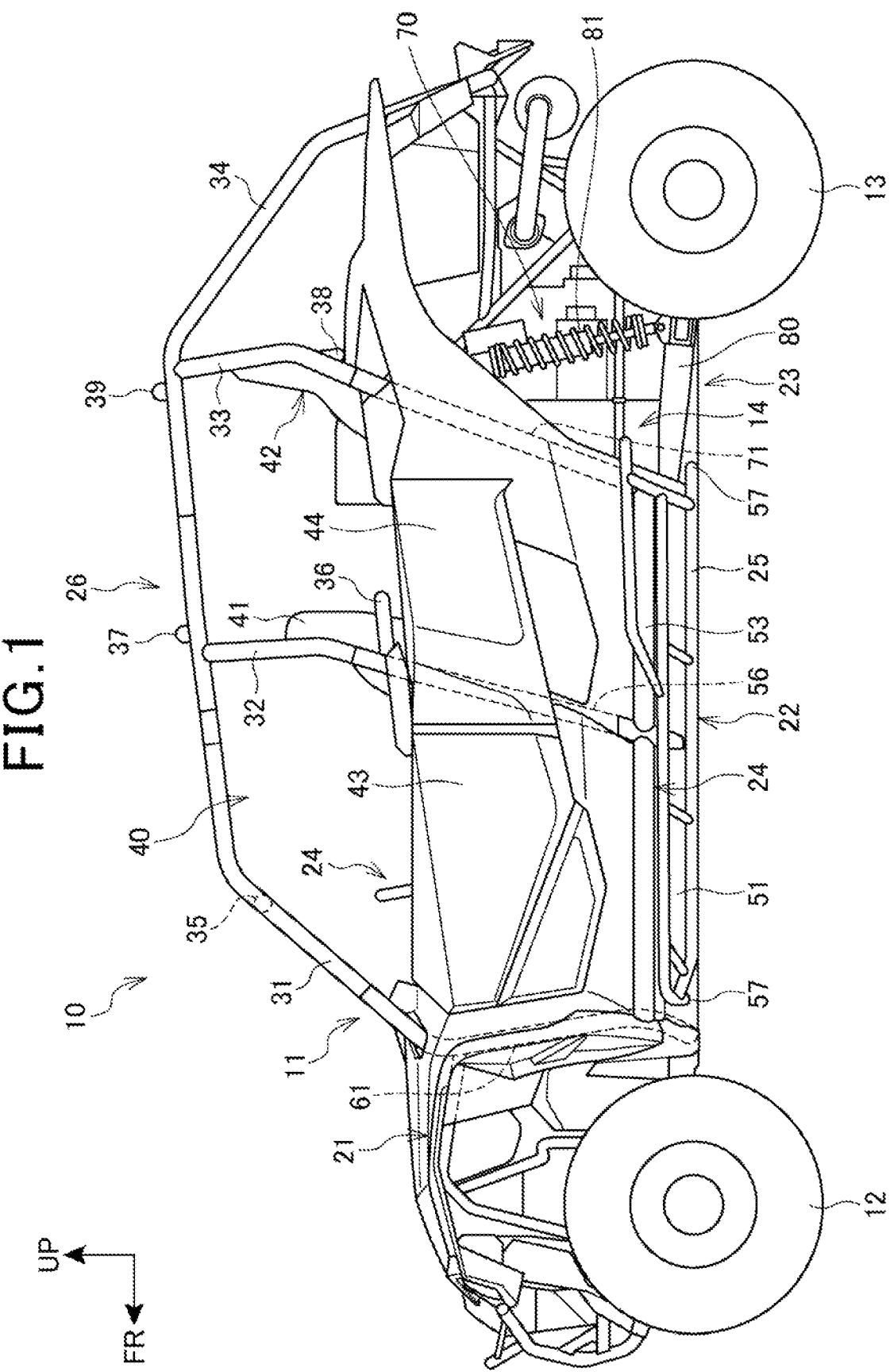
FIG. 1 is a left side elevation view of an all-terrain vehicle according to an embodiment of the present invention.

A specific embodiment to which the present invention is applied will be described below with reference to the accompanying drawings. Throughout the descriptions given hereunder, expressions indicating directions including front and rear, right and left, and upper and lower are identical to directions relative to a vehicle body unless otherwise specified. In the drawings, an arrow FR indicates an anterior direction of the vehicle body, an arrow UP indicates a superior direction of the vehicle body, and an arrow LH indicates a leftward direction of the vehicle body.

FIG. 1 is a left side elevation view of an all-terrain vehicle 10 according to an embodiment of the present invention.

The all-terrain vehicle 10 includes a vehicle body frame 11, a pair of left and right front wheels 12, and a pair of left and right rear wheels 13. The vehicle body frame 11 constitutes a framework. The front wheels 12 are supported at a front portion of the vehicle body frame 11. The rear wheels 13 are supported at a rear portion of the vehicle body frame 11. The all-terrain vehicle 10 is a multi-utility vehicle (MUV) including an engine 14, which is disposed at a posterior lower portion of the vehicle and which supplies the front wheels (drive wheels) 12 and the rear wheels (drive wheels) 13 with a driving force.

Figure 2:
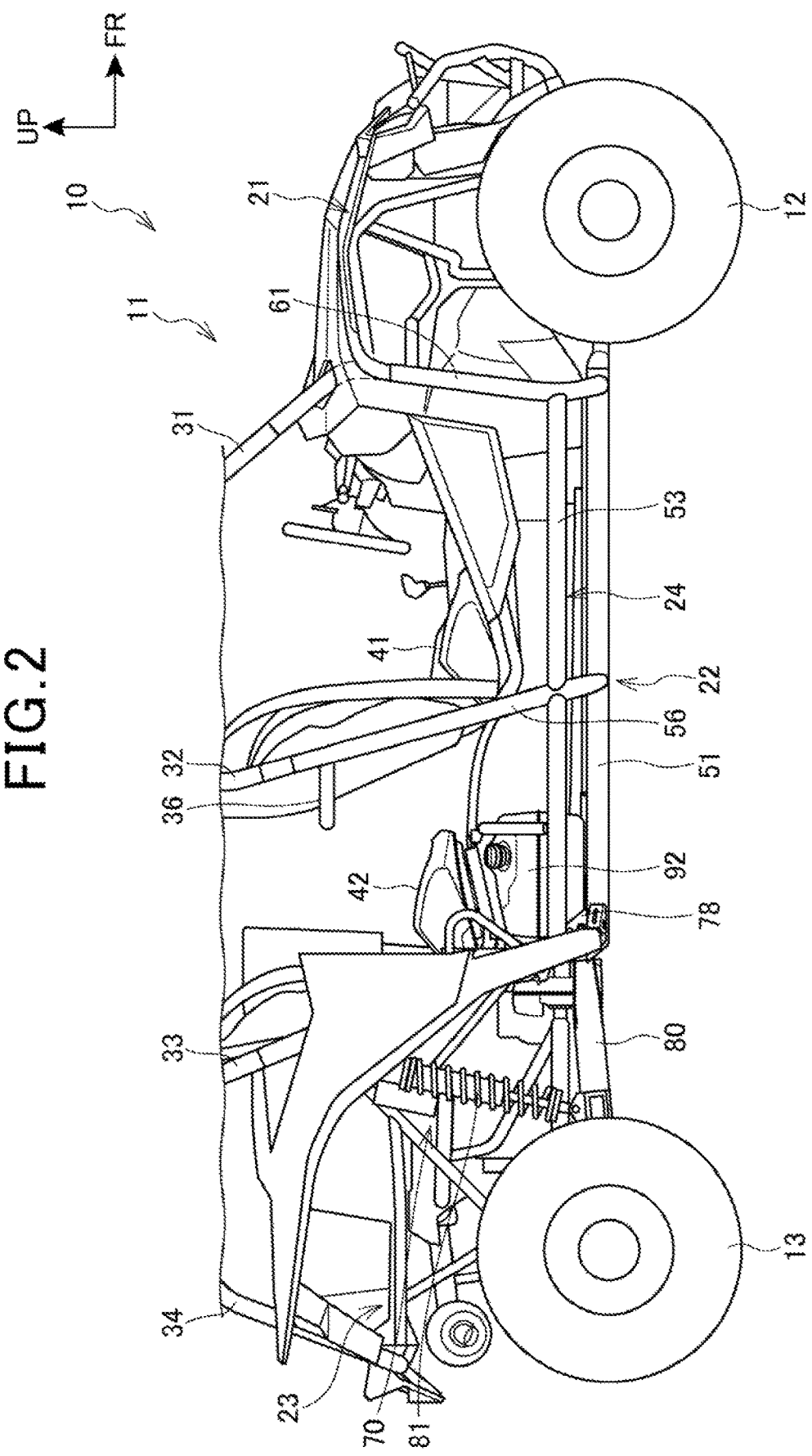
FIG. 2 is a right side elevation view of a part of a vehicle body frame of the all-terrain vehicle.

FIG. 2 is a right side elevation view of a part of the vehicle body frame 11 of the all-terrain vehicle 10.

The vehicle body frame 11 includes a front frame 21, a center frame 22, and a rear frame 23. The center frame 22 is connected with a rear portion of the front frame 21. The rear frame 23 is connected with a rear portion of the center frame 22. The vehicle body frame 11 further includes a pair of left and right side frames 24, a pair of left and right side guards 25 (see FIG. 1), and an upper portion frame 26. The side frames 24 are mounted on lateral portions of the center frame 22. The side guards 25 are mounted on the lateral portions of the center frame 22 at lower portions outside in a vehicle width direction of the side frames 24. The upper portion frame 26 is mounted so as to extend superiorly from the front frame 21, the side frames 24, and the rear frame 23.

The upper portion frame 26 includes a pair of left and right front pillars 31, a pair of left and right center pillars 32, a pair of left and right rear front pillars 33, and a pair of left and right rear pillars 34. The front pillars 31 extend from rear upper portions of the front frame 21 obliquely upwardly toward the rear. The center pillars 32 extend from intermediate portions in a fore-aft direction of the side frames 24 obliquely upwardly toward the rear. The rear front pillars 33 extend from front upper portions of the rear frame 23 upwardly. The rear pillars 34 extend from rear end portions of the rear frame 23 upwardly. Cross pipes 35, 36, 37, 38, and 39 connect between the left and right front pillars 31, between the left and right center pillars 32, and between the left and right rear pillars 34.

A space enclosed by the front frame 21, the center frame 22, the side frames 24, and the upper portion frame 26 constitutes a cabin 40, in which occupants ride.

A pair of left and right front-side seats 41 is disposed in the cabin 40 so as to overlap the center pillars 32 in a vehicle side view. The front-side seats 41 include a driver's seat on the left-hand side and a passenger's seat on the right-hand side. The front-side seats 41 are each supported on a lower side by the center frame 22.

A pair of left and right rear-side seats 42 is disposed in the cabin 40 so as to overlap the rear front pillars 33 in the vehicle side view. The rear-side seats 42 include a seat on the left-hand side and a seat on the right-hand side. The rear-side seats 42 are each supported on a lower side by the center frame 22.

Reference is made to FIG. 1. A pair of left and right front doors 43 is disposed outside in the vehicle width direction of the front-side seats 41. The front doors 43 are each opened or closed by a hinge mechanism, not depicted. Additionally, a pair of left and right rear doors 44 is disposed outside in the vehicle width direction of the rear-side seats 42. The rear doors 44 are each opened or closed by a hinge mechanism, not depicted. A side belt, not depicted, may be polygonally stretched across an area between each of the front doors 43 and the upper portion frame 26 and between each of the rear doors 44 and the upper portion frame 26 so as to narrow an opening beside the occupant. Stretching a net member across portions surrounded by the side belt prevents wood, gravel, and the like from entering the cabin 40 or prevents luggage from falling from the cabin 40 out onto the outside of the vehicle.

Figure 3:
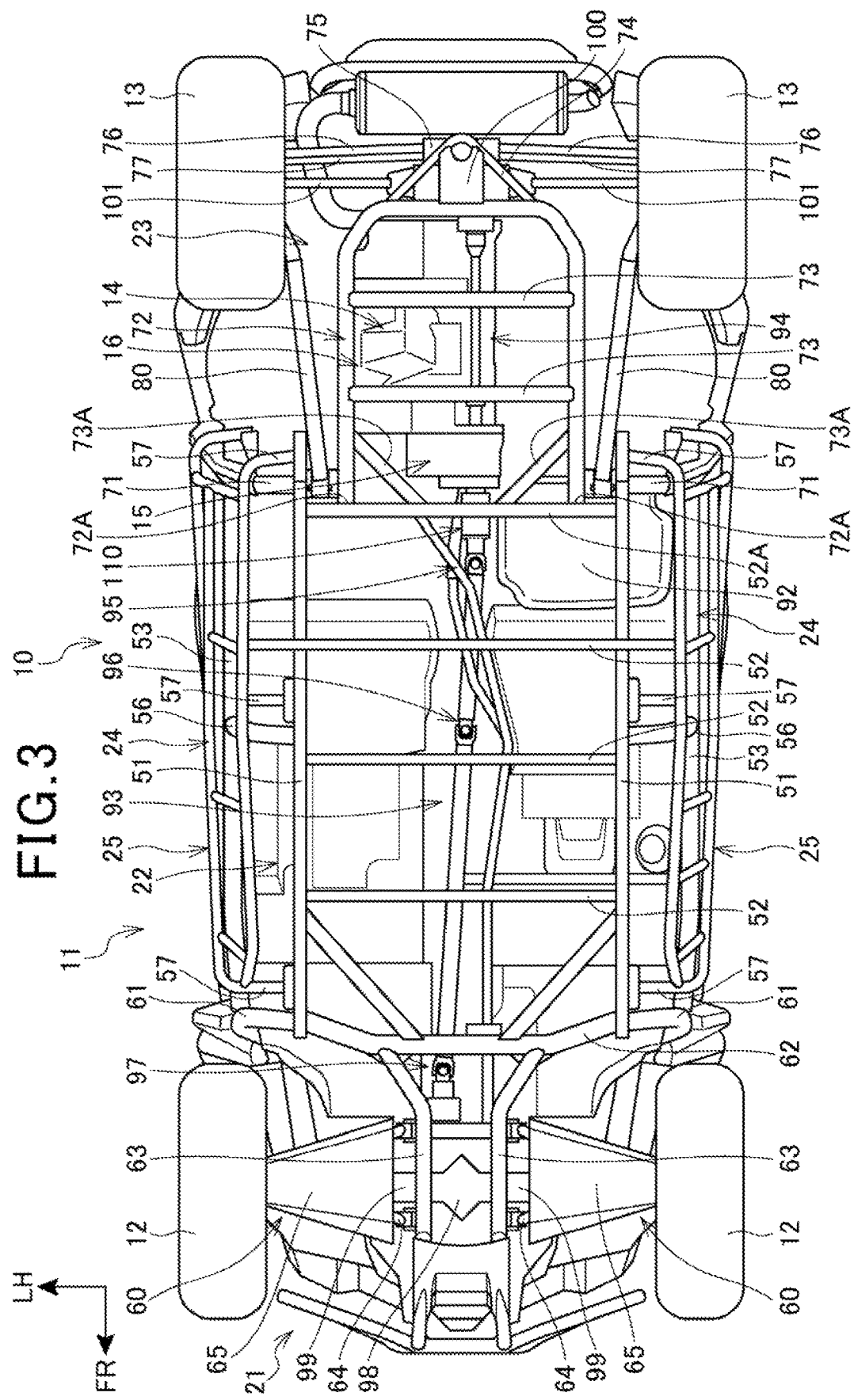
FIG. 3 is a bottom view of the all-terrain vehicle.

FIG. 3 is a bottom view of the all-terrain vehicle 10.

The center frame 22 includes a pair of left and right center lower frames 51, which extend in the fore-aft direction. A plurality of cross frames 52 and a rear end cross frame 52A, which extend in the vehicle width direction, are connected with the center lower frames 51.

The side frames 24 are connected with the center lower frames 51 from outside in the vehicle width direction. The side frames 24 each include a main unit portion 53. The main unit portion 53 extends from a rear portion of the front frame 21 to a front portion of the rear frame 23. The main unit portion 53 has a front end connected with a lower portion of a down frame portion 61 of the front frame 21. The main unit portion 53 has a rear end connected with a riser portion 71 of the rear frame 23. A center connection portion 56 is connected with a longitudinal central portion of the main unit portion 53. The center connection portion 56 extends from a longitudinal central portion of a corresponding one of the center lower frames 51 upwardly and is connected with a corresponding one of the center pillars 32.

The side guard 25 is disposed inferior to the side frame 24. The side guard 25 includes a plurality of connection portions 57. The connection portions 57 are disposed to be spaced apart from each other along the fore-aft direction. The side guard 25 is connected with the center lower frame 51 by the connection portions 57.

The front frame 21 is connected with the front portions of the center lower frames 51. The front frame 21 includes a front lower cross portion 62. The front lower cross portion 62 connects between front end portions of the center lower frames 51. The front lower cross portion 62 has both ends connected with respective lower ends of the down frame portions 61. A pair of left and right front lower frames 63, which extend anteriorly, is connected with the front lower cross portion 62. The front lower frames 63 are each formed substantially into an L-shape extending anteriorly and obliquely inwardly in the vehicle width direction.

A front lower arm 64 is swingably supported on each of the front lower frames 63. The front lower arm 64 is covered in a cover 65 from below. The front wheel 12 is supported at a distal end of the front lower arm 64 via a knuckle, not depicted.

The front lower arm 64, and a front upper arm, a cushion unit, and other parts, not depicted, constitute a front suspension 60. The front wheels 12 are supported on the front frame 21 via the front suspensions 60.

A rear lower frame 72 of the rear frame 23 is connected with the rear portion of the center lower frames 51. The rear lower frame 72 is bent into a U-shape opening anteriorly. A width across left and right front end portions 72A of the rear lower frame 72 is narrower than a width of the left and right center lower frames 51. The front end portions 72A are connected with the rear end cross frame 52A. A plurality of cross frames 73, which extend in the vehicle width direction, is connected with the rear lower frame 72. A pair of left and right inclined frames 73A is connected with the rear end cross frame 52A and the rear lower frame 72. An engine 14 is disposed superior to the inclined frames 73A.

A rear lower bent portion 74, which is bent into a triangular shape, is connected with a rear portion of the rear lower frame 72. A frame 75, which extends superiorly, is supported on the rear lower bent portion 74. The frame 75 swingably supports a pair of left and right rear lower arms 76 and a pair of left and right rear upper arms 77. The rear wheels 13 are supported by distal ends of the rear lower arms 76 and the rear upper arms 77 via knuckles, not depicted.

Figure 4:
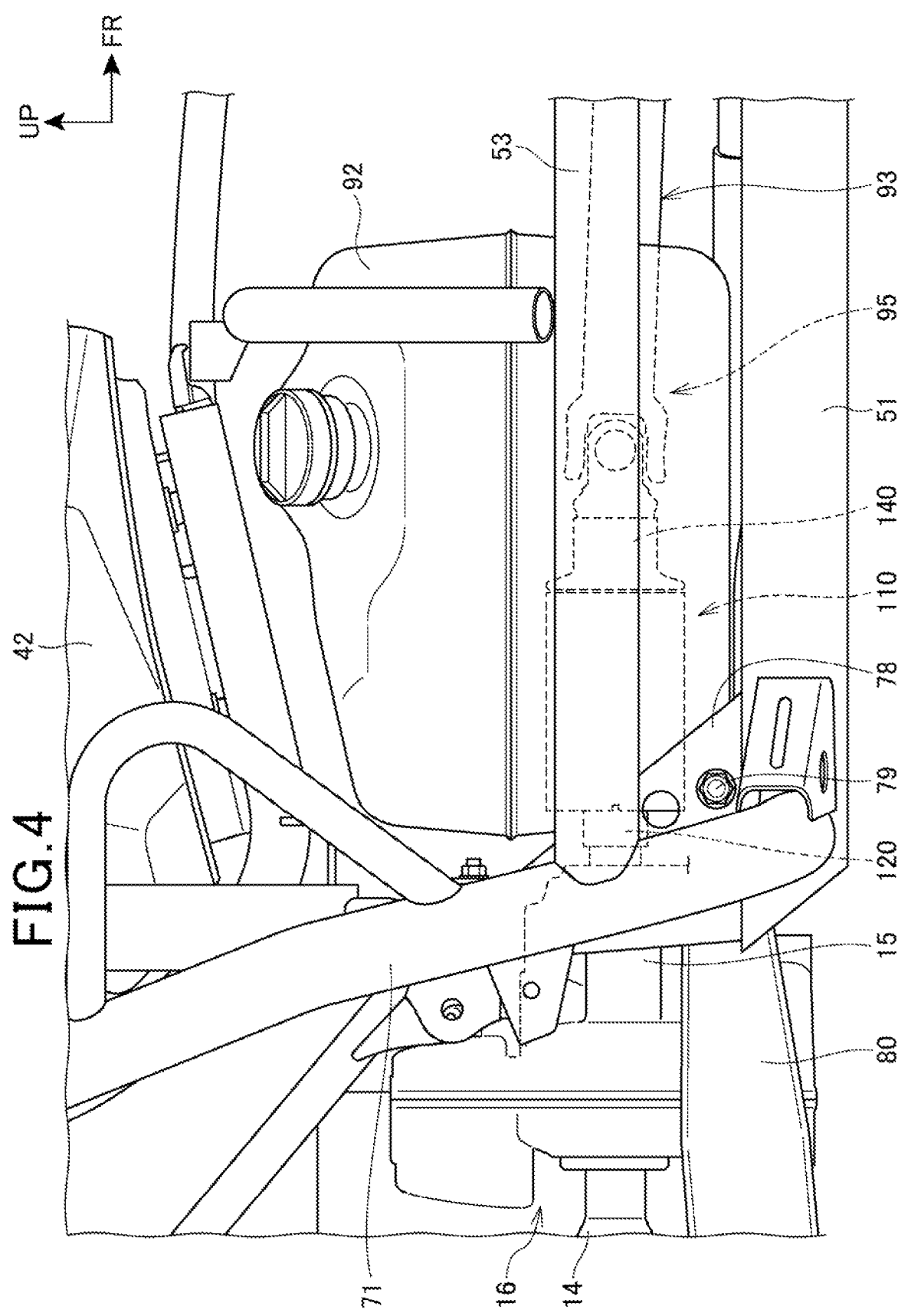
FIG. 4 is a right side elevation view of a riser portion of the vehicle body frame.

FIG. 4 is a right side elevation view of the riser portion 71 of the vehicle body frame 11.

Reference is made to FIGS. 3 and 4. The riser portion 71 of the rear frame 23 extends from a rear end portion of the center lower frame 51 obliquely upwardly toward the rear. A pivot frame 78 is fixed to a lower end portion of the riser portion 71. A swing arm 80 is swingably supported by the pivot frame 78 via a pivot shaft 79, which extends in the vehicle width direction. The swing arm 80 extends posteriorly in the bottom view and has a rear end portion bent toward the outside in the vehicle width direction into an L-shape. The abovementioned knuckle, not depicted, is supported and the rear wheel 13 is supported at the rear end portion of the swing arm 80.

A rear upper frame, not depicted, is connected with the riser portion 71. A cushion unit 81 is suspended at the rear upper frame, not depicted. The cushion unit 81 is connected with an intermediate portion in the fore-aft direction of the swing arm 80 and suspends the swing arm 80.

The rear lower arm 76, the rear upper arm 77, the swing arm 80, the cushion unit 81, and other parts constitute a rear suspension 70.

The rear lower frame 72 supports a power unit 16. The power unit 16 includes the engine 14 and a transmission 15. The engine 14 is what is called a vertical engine including a crankshaft extending in the fore-aft direction. The engine 14 is supplied with fuel from a fuel tank 92, which is disposed at a position superior to, and to the right of, the engine 14. The fuel tank 92 is disposed inferior to the rear-side seat 42 on the right-hand side (see FIG. 4) and overlaps the rear end cross frame 52A in the bottom view.

A front-side propeller shaft 93 and a rear-side propeller shaft 94 are connected with the transmission 15 at a position between the left and right rear-side seats 42.

In FIG. 3, the front-side propeller shaft 93 extends anteriorly from the power unit 16. The front-side propeller shaft 93 includes a plurality of universal joint portions 95, 96, and 97. The front-side propeller shaft 93 extends anteriorly from the power unit 16, while being inclined slightly toward the left, and is connected with a front wheel final drive unit 98. The front wheel final drive unit 98 is supported by the front lower frames 63.

A pair of left and right front wheel drive shafts 99 is connected with the front wheel final drive unit 98. The front wheel drive shafts 99 are connected with the respective front wheels 12 and transmit a driving force to the front wheels 12.

The rear-side propeller shaft 94 extends posteriorly from the power unit 16 and is connected with a rear wheel final drive unit 100. The rear wheel final drive unit 100 is supported by the rear lower bent portion 74 of the rear frame 23. A pair of left and right rear wheel drive shafts 101 is connected with the rear wheel final drive unit 100. The rear wheel drive shafts 101 are connected with the respective rear wheels 13 and transmit a driving force to the rear wheels 13.

Figure 5:
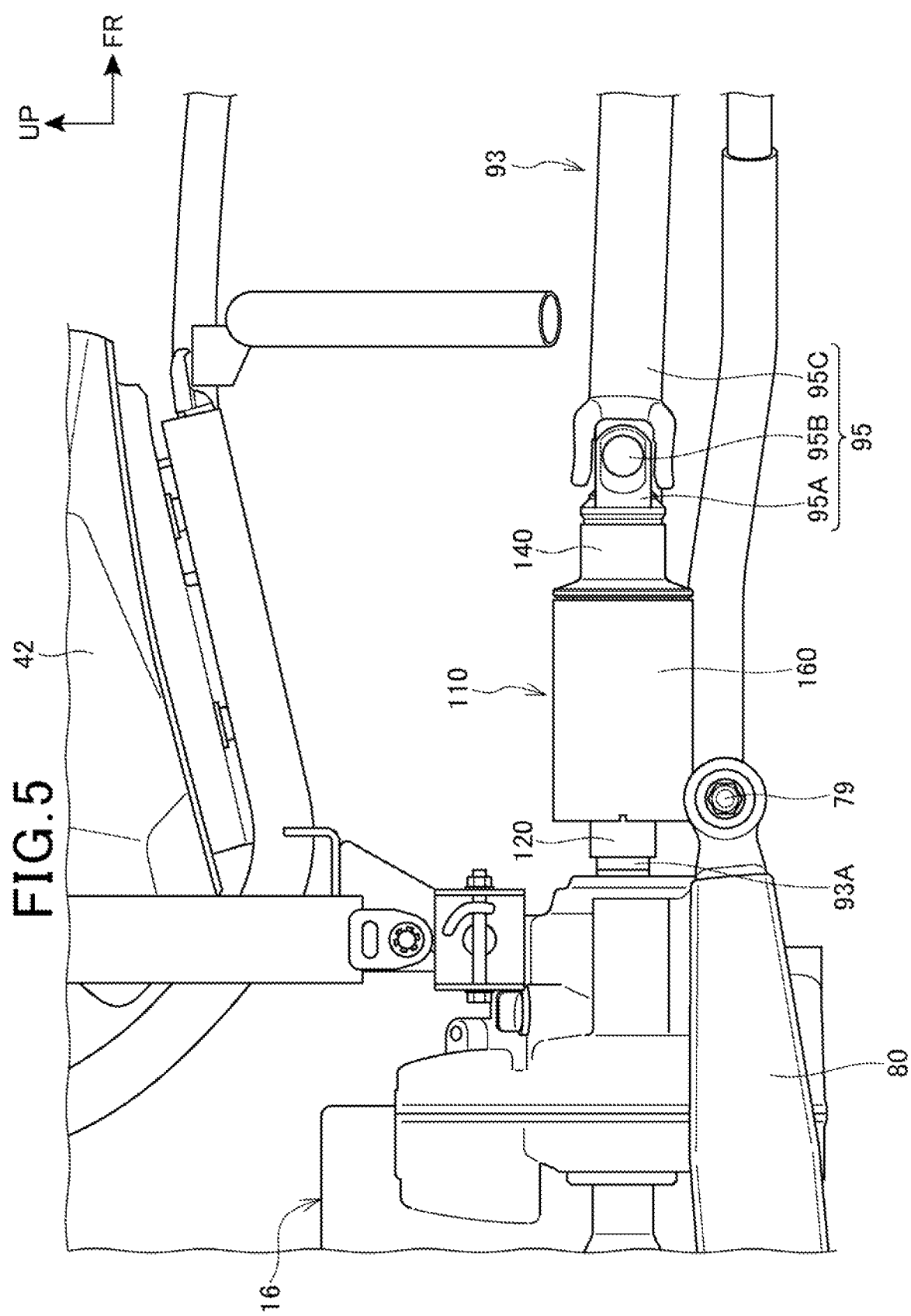
FIG. 5 is an enlarged view of major components of a front-side propeller shaft.

FIG. 5 is an enlarged view of major components of the front-side propeller shaft 93.

The front-side propeller shaft (drive shaft) 93 includes a cam damper 110 at a midway portion thereof. The cam damper 110 is unitized. The cam damper 110 has a first end side connected with either one of a drive shaft and a driven shaft. The cam damper 110 has a second end side connected with the other one of the drive shaft and the driven shaft.

In the embodiment, the front-side propeller shaft 93 includes a drive shaft 93A, the cam damper 110, a yoke shaft 95A of the universal joint portion 95, and other parts. The drive shaft 93A is connected with an output shaft, not depicted, of the transmission 15. The cam damper 110 is connected with the drive shaft 93A. The yoke shaft 95A of the universal joint portion 95 is connected with the cam damper 110. The yoke shaft 95A is connected with a yoke shaft 95C, which is paired up with the yoke shaft 95A, via a spider 95B. The yoke shaft 95A, the spider 95B, and the yoke shaft 95C constitute the universal joint portion 95.

In the embodiment, the drive shaft 93A is so short that the cam damper 110 is disposed to be immediately close to the power unit 16. Specifically, as depicted in FIG. 3, the cam damper 110 overlaps the rear end cross frame 52A in the bottom view. As depicted in FIG. 4, the cam damper 110 overlaps the fuel tank 92 in a vehicle side view. As such, because the cam damper 110 is disposed immediately close to the power unit 16 and is close to the output shaft of the engine 14, a sound deadening effect can be readily obtained. It is noted that a spring damper, not depicted, is disposed inside the engine 14.

Figure 6:
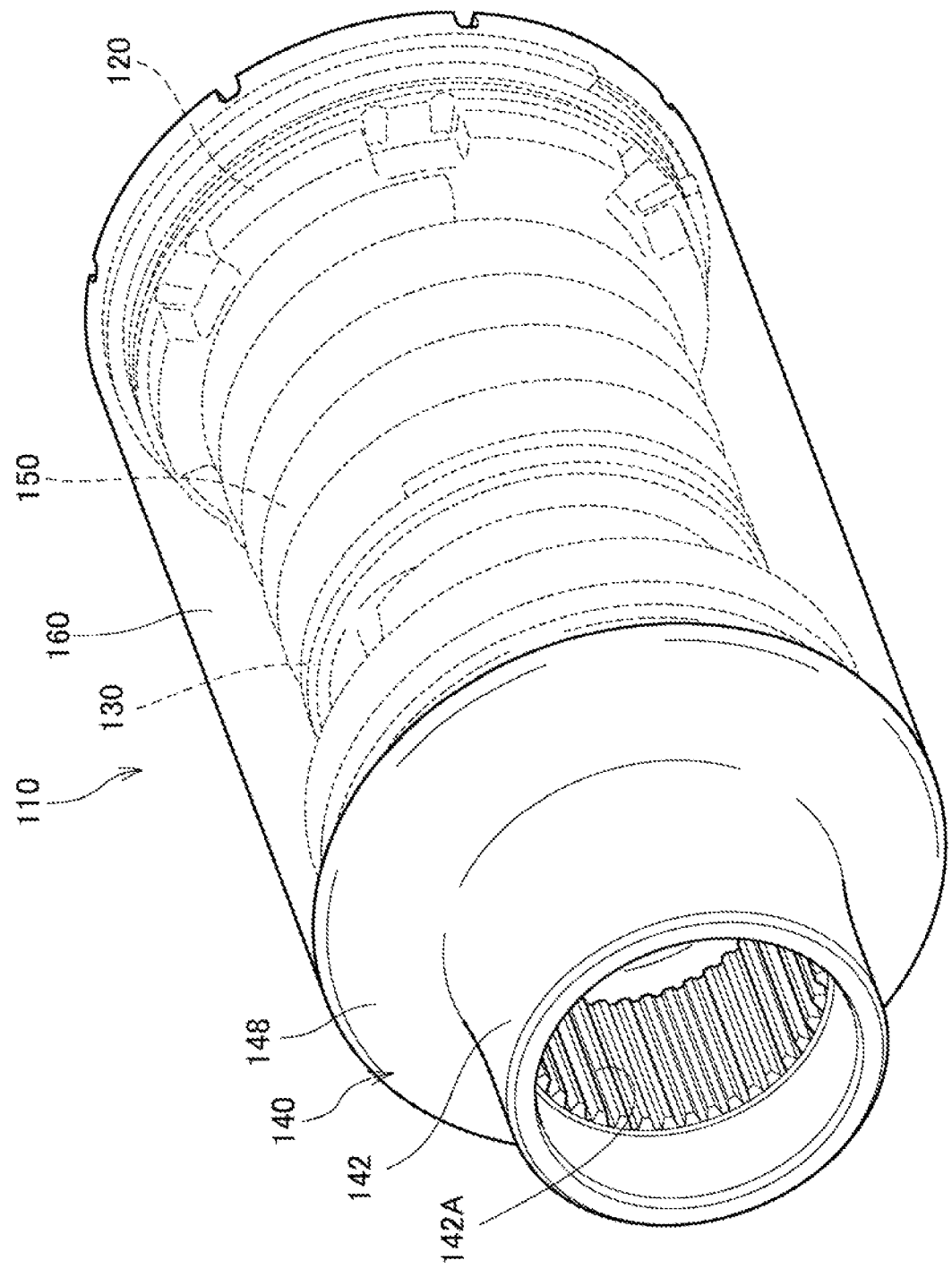
FIG. 6 is a perspective view of a cam damper.
Figure 7:
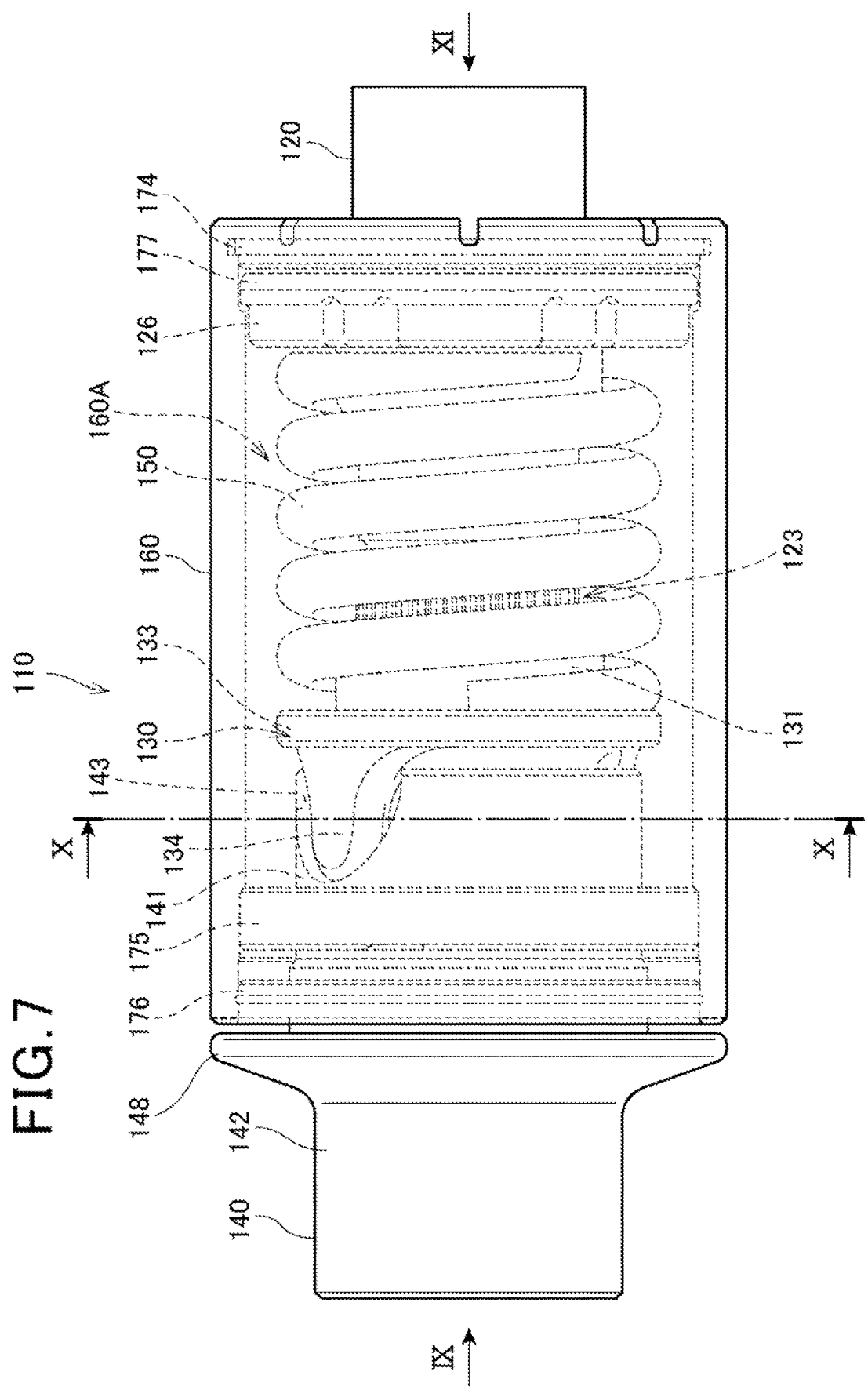
FIG. 7 is a left side elevation view of the cam damper.
Figure 8:
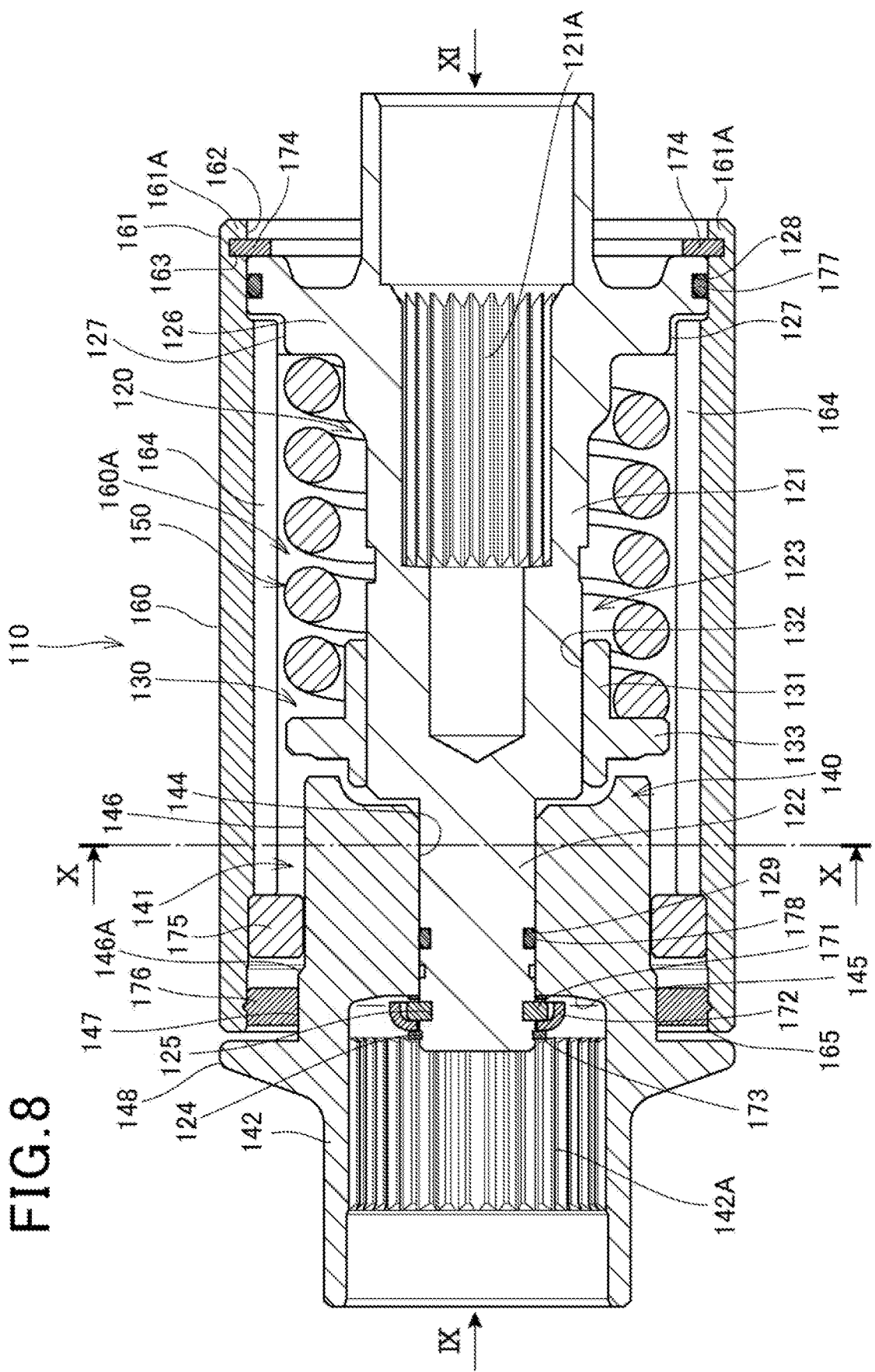
FIG. 8 is a cross-sectional view of the cam damper.
Figure 9:
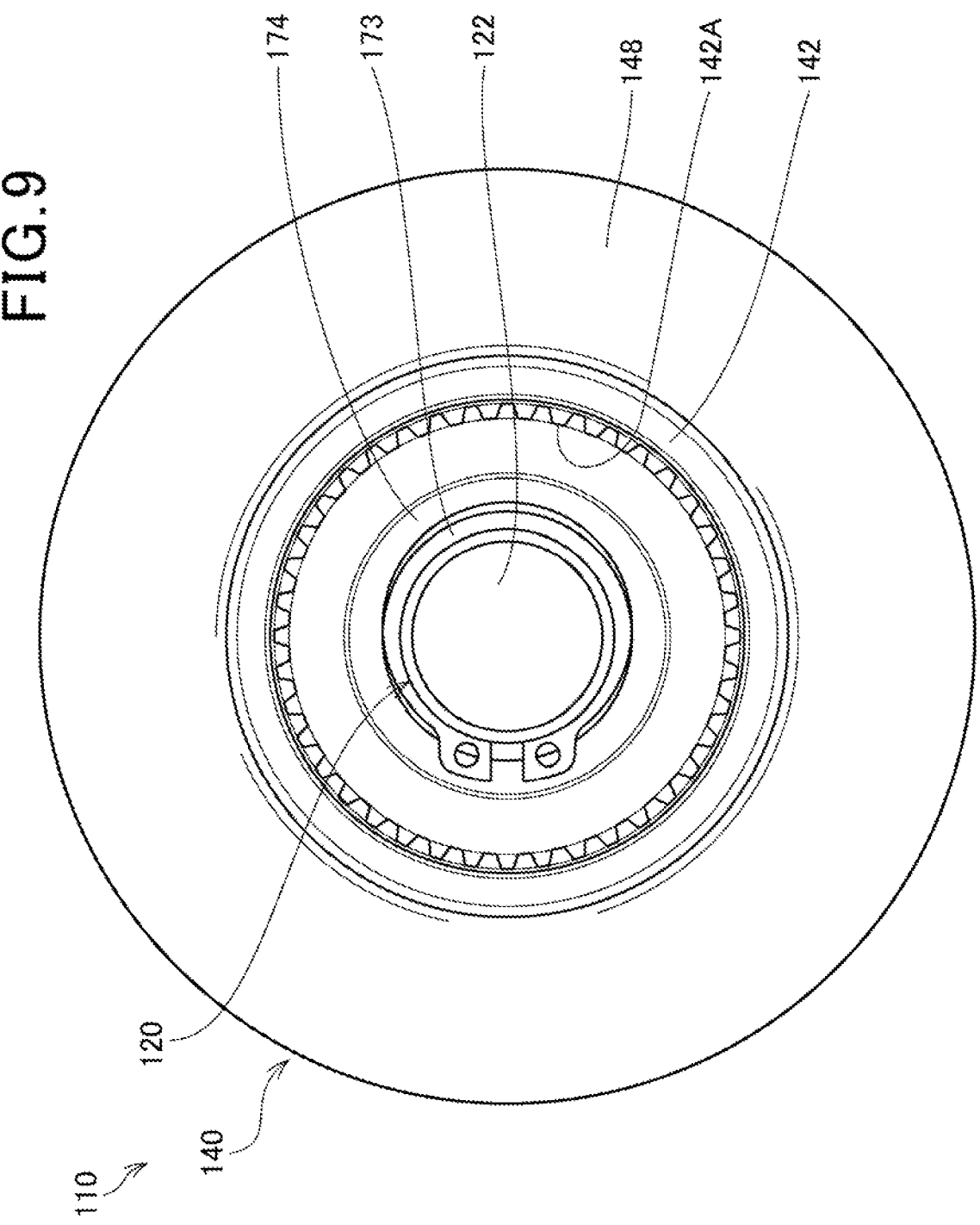
FIG. 9 is a view on arrow IX in FIGS. 7 and 8.
Figure 10:
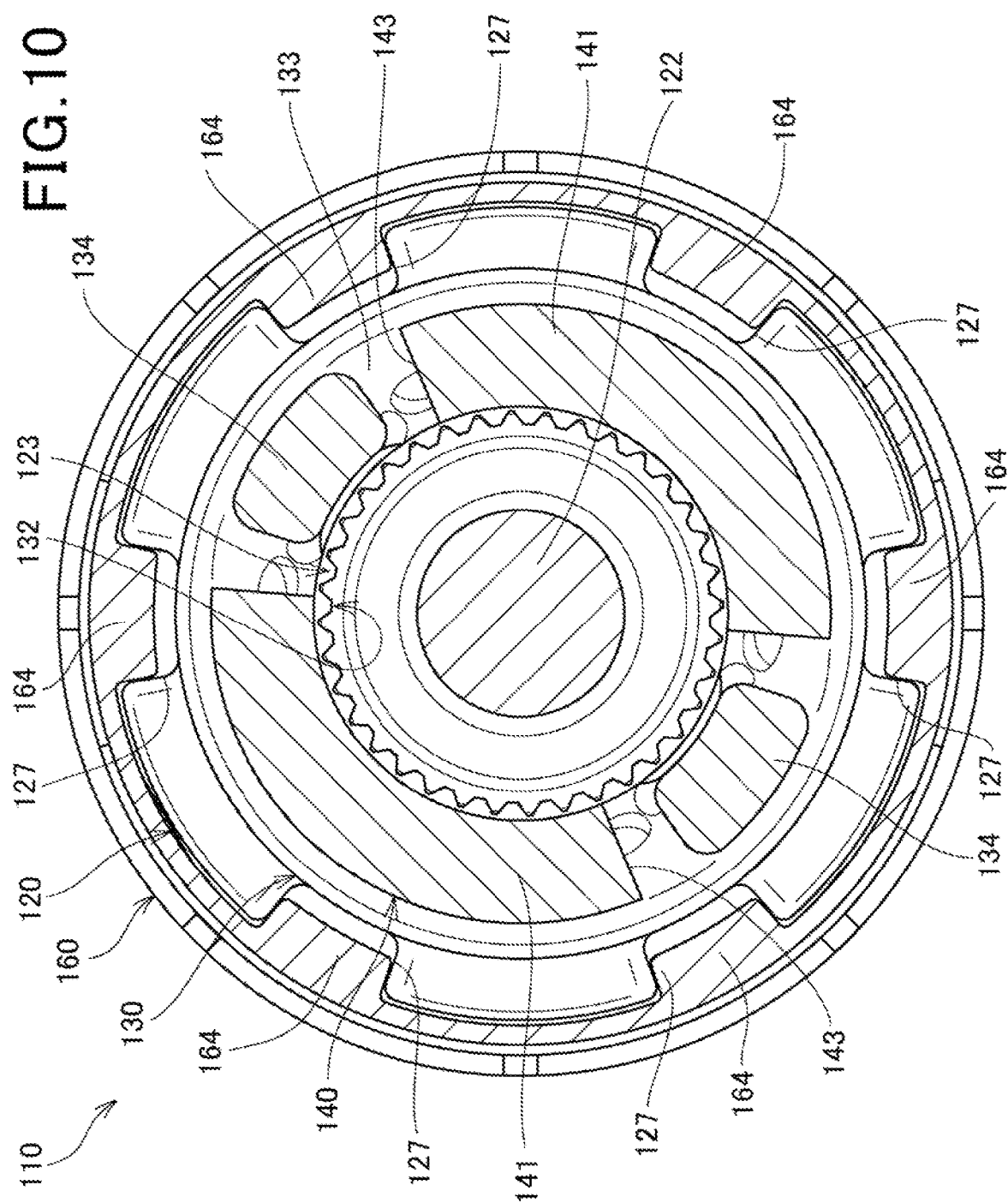
FIG. 10 is a cross-sectional view taken along line X-X in FIGS. 7 and 8.
Figure 11:
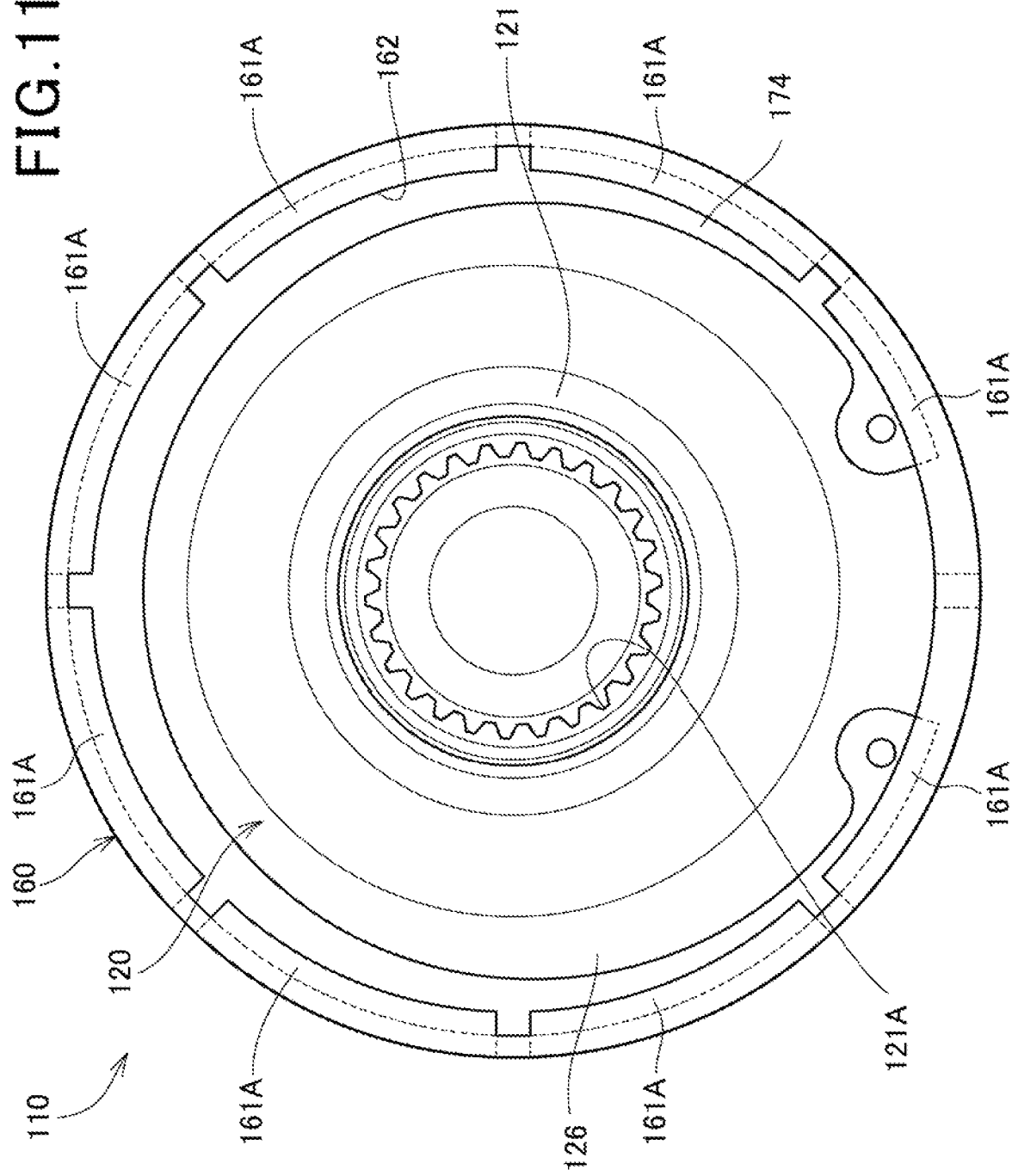
FIG. 11 is a view on arrow XI in FIGS. 7 and 8.

FIG. 6 is a perspective view of the cam damper 110. FIG. 7 is a left side elevation view of the cam damper 110. FIG. 8 is a cross-sectional view of the cam damper 110. FIG. 9 is a view on arrow IX in FIGS. 7 and 8. FIG. 10 is a cross-sectional view taken along line X-X in FIGS. 7 and 8. FIG. 11 is a view on arrow XI in FIGS. 7 and 8.

The cam damper 110 includes a shaft member 120, a cam 130, a cam reception portion 140, a compression spring (elastic member) 150, and an outer cylinder 160. The cam 130 is supported by the shaft member 120. The cam reception portion 140 engages with the cam 130. The compression spring 150 urges the cam 130 toward, and compresses the cam 130 against, cam reception portion 140 side. The outer cylinder 160 has a cylindrical shape. While the cam damper 110 is unitized, the description to be made with reference to FIG. 6 and onward will be made with reference to the side of the cam reception portion 140 defined as front relative to the shaft member 120 and to the side of the shaft member 120 defined as rear relative to the cam reception portion 140, as in FIG. 5.

In FIG. 8, the shaft member 120 includes a main unit portion (engagement portion) 121, a shaft portion 122, and a flange portion (enlarged-diameter portion) 126. The main unit portion 121 has a cylindrical shape. The shaft portion 122 is formed at a front end of the main unit portion 121 and has a diameter smaller than a diameter of the main unit portion 121. The flange portion 126 is formed at a rear portion of the main unit portion 121 and has a diameter enlarged in a radial direction from the main unit portion 121.

The main unit portion 121 has groove-shaped outer peripheral splines 123. The outer peripheral splines 123 are formed to extend in an axial direction in a front end portion on an outer peripheral side of the main unit portion 121.

The cam 130 includes a cylindrical base portion 131. The base portion 131 has an inner peripheral surface in which splines 132 are formed. The splines 132 fit in the outer peripheral splines 123 in the shaft member 120. By the splines 132 fitting in the outer peripheral splines 123, the base portion 131 is supported slidably in the axial direction relative to the shaft member 120 and, when the shaft member 120 rotates, the base portion 131 is rotated integrally with the shaft member 120.

The base portion 131 has a cam flange portion 133 formed at a front end portion thereof. The cam flange portion 133 has a diameter increased relative to the outer periphery of the base portion 131. The compression spring 150 is disposed between the cam flange portion 133 and the flange portion 126 of the shaft member 120. Resilience of the compression spring 150 causes the cam 130 to be urged toward the cam reception portion 140 side.

A pair of cam portions 134 is formed on an outer peripheral end of the cam flange portion 133. The cam portions 134 are disposed at axially symmetrical positions. The cam portions 134 each have an outer peripheral shape protruding anteriorly into a U-shape relative to the cam flange portion 133. The cam portions 134 engage with the cam reception portion 140.

The cam reception portion 140 is formed into a cylindrical shape. The cam reception portion 140 includes a main reception portion 141 and a shaft engagement portion 142. The main reception portion 141 has a thick wall. The shaft engagement portion 142 has a thin wall.

The main reception portion 141 has a pair of cam grooves 143. The cam groove 143 is formed into a U-shape opening toward the rear and recessed with respect to the outer peripheral surface. The cam portions 134 of the cam 130 advance into, and are disposed in, the cam grooves 143. Outer peripheral surfaces of the cam portions 134 contact inner peripheral surfaces of the cam grooves 143, which results in torque being exchanged between the cam 130 and the cam reception portion 140.

The main reception portion 141 has a shaft insertion hole 144. The shaft insertion hole 144 is formed in a center in the radial direction of the main reception portion 141 to extend in the axial direction. The shaft portion 122 of the shaft member 120 is inserted in the shaft insertion hole 144. The shaft insertion hole 144 is formed to be shorter in length than the shaft portion 122 and the shaft portion 122 is disposed in the shaft insertion hole 144 in a condition in which a distal end of the shaft portion 122 protrudes anteriorly. The shaft portion 122 has a distal end recessed groove 124 and a recessed groove 125. The distal end recessed groove 124 is formed annularly. The recessed groove 125 is disposed posterior to the distal end recessed groove 124 and formed to be deeper than the distal end recessed groove 124. An annular bearing member 171 is disposed in the recessed groove 125. The bearing member 171 is formed to have an outside diameter greater than an inside diameter of the shaft insertion hole 144. The bearing member 171 contacts a bottom portion 145 of the main reception portion 141. An annular member 172, which covers the bearing member 171, is disposed anterior to the bearing member 171. A circlip 173 is fitted in the distal end recessed groove 124. The mounting of the circlip 173 causes the bearing member 171 to be clamped between the circlip 173 and the bottom portion 145 of the main reception portion 141 to thereby restrict the shaft portion 122 from being removed from the main reception portion 141.

The cam 130 is covered in the outer cylinder 160. The outer cylinder 160 is formed into a cylindrical shape. The outer cylinder 160 forms a containing space 160A thereinside. The outer cylinder 160 has openings 165 and 162 in both longitudinal ends thereof. The outer cylinder 160 includes an extension portion 161. The extension portion 161 is formed to extend posteriorly beyond the flange portion 126 of the shaft member 120. An end portion wall 161A is formed at a rear end portion of the extension portion 161, toward which the extension portion 161 extends. The end portion wall 161A has an outer end bent inwardly. A plurality of the end portion walls 161A are formed while being spaced apart from each other in a circumferential direction. The end portion walls 161A have radial inner end edges forming the opening 162 having a circular shape. The opening 162 has an inside diameter corresponding to an outside diameter of the flange portion 126, which is formed in the shaft member 120. The shaft member 120 can be inserted via the opening 162.

An annular recessed groove 163 is formed at a position anterior to the end portion wall 161A. The recessed groove 163 is recessed outwardly in the radial direction. A circlip (engagement member) 174 is mounted in the recessed groove 163. The circlip 174 has an inside diameter smaller than an inside diameter of the opening 162 and smaller than an outside diameter of the flange portion 126 of the shaft member 120. The circlip 174 restricts the shaft member 120 from being removed from the opening 162.

The outer cylinder 160 includes a protrusion 164, which is formed on an inner peripheral portion thereof. The protrusion 164 protrudes inwardly and extends axially. A plurality of the protrusions 164 are formed in a circumferential direction. The protrusions 164 are spaced predetermined intervals apart from each other. The protrusions 164 have rear end sides (first end sides) engaged with the shaft member 120.

A recessed portion (reception portion) 127 is formed in a front surface of the flange portion 126 of the shaft member 120. The recessed portion 127 is recessed from the front side to the rear side. A plurality of the recessed portions 127 are formed in a circumferential direction and the recessed portions 127 are spaced predetermined intervals apart from each other. The protrusions 164 have rear end portions fitted in the respective recessed portions 127. When the shaft member 120 rotates, inner peripheral surfaces of the recessed portions 127 contact outer peripheral surfaces of the protrusions 164 to thereby cause the outer cylinder 160 to rotate integrally with the shaft member 120.

The main reception portion 141 of the cam reception portion 140 includes a small-diameter portion 146 and a large-diameter portion 147. The small-diameter portion 146 is disposed on the side of the cam 130. The large-diameter portion 147 has a diameter greater than the diameter of the small-diameter portion 146 and is disposed on the side of the shaft engagement portion 142. A shouldered portion 146A is formed between the small-diameter portion 146 and the large-diameter portion 147. A collar member 175 is disposed between front ends of the protrusions 164 and the shouldered portion 146A. The collar member 175 has such an outside diameter that the collar member 175 is press-fitted in the outer cylinder 160. The collar member 175 supports the cam reception portion 140 such that the cam reception portion 140 is relatively rotatable with respect to the outer cylinder 160.

A sealing member 176 is disposed at the large-diameter portion 147. The sealing member 176 hermetically seals between the cam reception portion 140 and the outer cylinder 160 to thereby prevent lubricating oil from leaking from the containing space 160A.

A flange portion (enlarged-diameter portion) 148 is formed at the shaft engagement portion 142 of the cam reception portion 140. The flange portion 148 is formed to have a diameter greater relative to the outer periphery of the shaft engagement portion 142. The flange portion 148 has an outside diameter corresponding to the outside diameter of the outer cylinder 160. As depicted in FIG. 6, the flange portion 148 overlaps the sealing member in the axial direction to thereby prevent dust from entering the containing space.

The shaft member 120 has an annular rear end recessed groove (recessed groove) 128. The rear end recessed groove 128 is formed in an outer end of the flange portion 126. A sealing member 177 is disposed in the rear end recessed groove 128. Additionally, the shaft portion 122 has an annular shaft portion recessed groove 129. A sealing member 178, which closes a gap between the shaft portion 122 and the shaft insertion hole 144, is disposed in the shaft portion recessed groove 129. The sealing members 177 and 178 prevent lubricating oil from leaking from the containing space.

Inner peripheral splines 121A are formed in an inner peripheral surface of the main unit portion 121 of the shaft member 120. Splines (not depicted) in the drive shaft (shaft on the drive side) 93A fit in the inner peripheral splines 121A. The splined connection allows the shaft member 120 to be integrally rotated with the drive shaft 93A.

Inner peripheral splines 142A are formed in an inner peripheral surface of the shaft engagement portion 142 of the cam reception portion 140. Splines (not depicted) in the yoke shaft (shaft on the driven side) 95A fit in the inner peripheral splines 142A. The splined connection allows the cam reception portion 140 and the yoke shaft 95A to be integrally rotated.

In the cam damper 110, the compression spring (elastic member) 150 urges the cam 130 toward the side of the cam reception portion 140. When variations in torque are small, the condition in which the cam portions 134 are disposed in the cam grooves 143 is maintained and the shaft member 120, the cam 130, the cam reception portion 140, and the outer cylinder 160 rotate integrally. When the variations in torque are large, the cam 130 resists the urging force of the compression spring 150 to thereby slide posteriorly with respect to the shaft member 120, while the cam portions 134 are being guided along the inner peripheral surfaces of the cam grooves 143. At this time, the compression spring 150 is elastically deformed and the cam 130, the shaft member 120, and the outer cylinder 160 rotate with respect to the cam reception portion 140, so that the variations in torque between the shaft member 120 and the cam reception portion 140 are dampened.

As described above, in the embodiment, the unitized cam damper 110 dampens variations in torque between the output shaft of the power unit 16 and the front-side propeller shaft 93.

An example of a method for assembling the cam damper 110 will be described.

Press-fit the collar member 175 into the outer cylinder 160.

Mount the sealing members 177 and 178 in the rear end recessed groove 128 and the shaft portion recessed groove 129, respectively, in the shaft member 120. Fit the compression spring 150 to the shaft member 120 and bring the outer peripheral splines 123 in the shaft member 120 into splined engagement with the cam 130. Insert the shaft member 120 via the opening 162 in the outer cylinder 160 and fit the protrusions 164 of the outer cylinder 160 into the recessed portions 127 in the flange portion 126. Install the circlip 174 at the opening 162.

Mount the sealing member 176 in the large-diameter portion 147 of the cam reception portion 140. Place the cam reception portion 140 into the opening 165 in the outer cylinder 160 so that the shaft portion 122 of the shaft member 120 is inserted into the shaft insertion hole 144.

Mount the bearing member 171 and the annular member 172 at the distal end of the shaft portion 122 of the shaft member 120 and mount the circlip 173 to thereby lock the cam reception portion 140 in place. The foregoing steps unitize the cam damper 110.

As described above, the vehicle cam damper structure according to the embodiment of the present invention is applied to a vehicle in which the driving force of the engine 14 is transmitted to the front wheels 12 via the front-side propeller shaft 93. In the vehicle cam damper structure, the front-side propeller shaft 93 connects between the engine 14 and the front wheels 12 and includes the cam damper 110 at a midway portion thereof. The cam damper 110 integrates the cam reception portion 140 with the cam 130 via the shaft member 120. The cam reception portion 140 is connected relatively rotatably with the shaft member 120. The cam 130 and the shaft member 120, while being integrally rotatable, are connected with each other axially slidably. The shaft member 120 includes the flange portion 126. The compression spring 150, which presses the cam 130 toward the side of the cam reception portion 140, is disposed between the flange portion 126 and the cam 130. The outer cylinder 160 extends across the cam reception portion 140 and the shaft member 120. The drive shaft 93A and the yoke shaft 95A of the front-side propeller shaft 93 are each connected with corresponding one of the cam reception portion 140 and the shaft member 120. Thus, the cam damper 110 is independent as a unit and can be disposed at any place in the front-side propeller shaft 93. Additionally, the cam damper 110, because of being configured to have either end connectable with the drive shaft 93A and the yoke shaft 95A, can be applied to any vehicle model.

In the embodiment, the cam reception portion 140 includes the shaft engagement portion 142, which is to be connected with the yoke shaft 95A, at an end portion thereof and the shaft member 120 includes the main unit portion 121, which is to be connected with the drive shaft 93A, at an end portion thereof. Thus, connection with the drive shaft 93A or the yoke shaft 95A can be made through a simple structure. Additionally, the drive shaft 93A and the yoke shaft 95A, which are to be connected, require only connection machining identical to existing machining.

In the embodiment, the shaft engagement portion 142 and the main unit portion 121 are each formed into a cylindrical shape covering the outer periphery of the drive shaft 93A or the yoke shaft 95A and the shaft engagement portion 142 and the main unit portion 121 have the inner peripheral splines 142A and the inner peripheral splines 121A, respectively, in the respective inner peripheral surfaces. Thus, connection with the drive shaft 93A or the yoke shaft 95A can be made through a simple structure. Additionally, the drive shaft 93A and the yoke shaft 95A, which are to be connected, require only connection machining identical to existing machining.

In the embodiment, the outer cylinder 160 includes the extension portion 161 at a first end thereof. The extension portion 161 is formed to extend beyond the flange portion 126 of the shaft member 120. The outer cylinder 160 further includes the protrusions 164 on the inner peripheral surface thereof. The protrusions 164 abut on the front side (first side) of the flange portion 126 in the containing space 160A. The outer cylinder 160 further has the recessed groove 163 in the back side (second side) of the flange portion 126, with which the circlip 174 is engaged. The outer cylinder 160 is thereby positioned with respect to the flange portion 126 of the shaft member 120 by the protrusions 164 and the circlip 174. Thus, the outer cylinder 160 can be simply configured and supported on the drive shaft 93A.

In the embodiment, the flange portion 126 has the recessed portions 127, against which the protrusions 164 abut in the circumferential direction. The outer cylinder 160 can thus be restricted from rotating with respect to the shaft member 120.

In the embodiment, the flange portion 126 has the rear end recessed groove 128 in the outer peripheral surface thereof. The sealing member 177 is disposed between the outer cylinder 160 and the outer peripheral surface. Thus, the containing space 160A in the outer cylinder 160 can be maintained airtight.

In the embodiment, the cam reception portion 140 includes the flange portion 148, which faces the end portion of the outer cylinder 160. The sealing member 176 and the collar member 175 are disposed between the outer periphery of the cam reception portion 140 and the inner peripheral surface of the outer cylinder 160. Thus, the collar member 175 can be positioned and airtightness can be achieved while relative rotation is being permitted with respect to the outer cylinder 160.

While the present invention has been particularly described with reference to the embodiment, it will be understood that the embodiment is illustrative only and is not intended to limit the present invention, and the invention may be embodied in other specific forms without departing from the spirit or essential characteristics thereof.

The embodiment has been described for a configuration, in which the drive shaft 93A is connected with the shaft member 120 through a splined connection and the yoke shaft 95A is connected with the cam reception portion 140 through a splined connection. A configuration may nonetheless be possible, in which the yoke shaft 95A is connected with the shaft member 120 through a splined connection and the drive shaft 93A is connected with the cam reception portion 140 through a splined connection.

The cam damper 110 may be connected with the output shaft of the transmission 15 through a splined connection.

The cam damper 110 has been described to be disposed in a midway portion of the front-side propeller shaft 93. The cam damper 110 may nonetheless be disposed in a midway portion of any drive shaft that transmits drive, including the rear-side propeller shaft 94.

The embodiment has been described as applied to the four-wheel vehicle as the all-terrain vehicle 10. The invention is not, however, limited thereto and can be applied also to saddled riding vehicles including a two-wheel saddled riding vehicle including two front or rear wheels and a saddled riding vehicle including three or more wheels.

DESCRIPTION OF REFERENCE SYMBOLS

12 Front wheel (drive wheel)
14 Engine
93 Front-side propeller shaft (drive shaft)
93A Drive shaft (shaft on the drive side)
95A Yoke shaft (shaft on the driven side)
110 Cam damper
120 Shaft member
121 Main unit portion (engagement portion)
121A Inner peripheral spline (spline)
126 Flange portion (enlarged-diameter portion)
127 Recessed portion (reception portion)
128 Rear end recessed groove (recessed groove)
130 Cam
140 Cam reception portion
142 Shaft engagement portion (engagement portion)
142A Inner peripheral spline (spline)
148 Flange portion (enlarged-diameter portion)
150 Compression spring (elastic member)
160 Outer cylinder
160A Containing space
161 Extension portion
163 Recessed groove
164 Protrusion
174 Circlip (engagement member)
175 Collar member
176 Sealing member
177 Sealing member

The invention claimed is:

1. A vehicle cam damper structure in a vehicle that transmits a driving force of an engine to a drive wheel via a drive shaft that connects between the engine and the drive wheel, the vehicle cam damper structure comprising:
   a cam damper disposed at a midway portion of the drive shaft, the cam damper including:
   a cam reception portion;
   a cam;
   a shaft member; and
   an outer cylinder, wherein
   the cam damper integrates the cam reception portion with the cam via the shaft member,
   the cam reception portion is connected relatively rotatably with the shaft member,
   the cam is connected with the shaft member integrally rotatably and axially slidably,
   the shaft member includes an enlarged-diameter portion,
   an elastic member that presses the cam toward a side of the cam reception portion is disposed between the enlarged-diameter portion and the cam,
   the outer cylinder is disposed across the cam reception portion and the shaft member,
   a drive-side shaft and a driven-side shaft of the drive shaft are each connected with corresponding one of the cam reception portion and the shaft member,
   the outer cylinder includes an extension portion at a first end of the outer cylinder, the extension portion extending beyond the enlarged-diameter portion of the shaft member,
   the outer cylinder includes a protrusion on an inner peripheral surface of the outer cylinder, the protrusion abutting on a first side of the enlarged-diameter portion in a containing space,
   the outer cylinder further includes a recessed groove in a second side of the enlarged-diameter portion, an engagement member being to be engaged with the recessed groove, and
   the outer cylinder is positioned with respect to the enlarged-diameter portion of the shaft member by the protrusion and the engagement member.

2. The vehicle cam damper structure according to claim 1, wherein
   the cam reception portion and the shaft member each include an engagement portion disposed at an end portion of each the cam reception portion and the shaft member, the engagement portion being to be connected with the drive-side shaft or the driven-side shaft.

3. The vehicle cam damper structure according to claim 2, wherein
   the engagement portion has a cylindrical shape covering an outer periphery of the drive-side shaft or the driven-side shaft, and
   the engagement portion has a spline formed in an inner peripheral surface.

4. The vehicle cam damper structure according to claim 1, wherein
   the enlarged-diameter portion has a reception portion, against which the protrusion abuts in a circumferential direction.

5. The vehicle cam damper structure according to claim 1, wherein
   the enlarged-diameter portion has a recessed groove formed in an outer peripheral surface, and
   a sealing member is disposed between the outer cylinder and the outer peripheral surface.

6. The vehicle cam damper structure according to claim 1, wherein
   the cam reception portion includes an enlarged-diameter portion that faces an end portion of the outer cylinder, and
   a sealing member and a collar member are disposed between an outer periphery of the cam reception portion and an inner peripheral surface of the outer cylinder.

7. A vehicle cam damper structure in a vehicle that transmits a driving force of an engine to a drive wheel via a drive shaft that connects between the engine and the drive wheel, the vehicle cam damper structure comprising:
   a cam damper disposed at a midway portion of the drive shaft, the cam damper including:
   a cam reception portion;
   a cam;
   a shaft member; and
   an outer cylinder, wherein
   the cam damper integrates the cam reception portion with the cam via the shaft member,
   the cam reception portion is connected relatively rotatably with the shaft member,
   the cam is connected with the shaft member integrally rotatably and axially slidably,
   the shaft member includes an enlarged-diameter portion,
   an elastic member that presses the cam toward a side of the cam reception portion is disposed between the enlarged-diameter portion and the cam,
   the outer cylinder is disposed across the cam reception portion and the shaft member, a drive-side shaft and a driven-side shaft of the drive shaft are each connected with corresponding one of the cam reception portion and the shaft member, the enlarged-diameter portion has a recessed groove formed in an outer peripheral surface, and a sealing member is disposed between the outer cylinder and the outer peripheral surface.

8. A vehicle cam damper structure in a vehicle that transmits a driving force of an engine to a drive wheel via a drive shaft that connects between the engine and the drive wheel, the vehicle cam damper structure comprising:

a cam damper disposed at a midway portion of the drive shaft, the cam damper including:
        a cam reception portion;
        a cam;
        a shaft member; and
        an outer cylinder, wherein
    the cam damper integrates the cam reception portion with the cam via the shaft member,
    the cam reception portion is connected relatively rotatably with the shaft member,
    the cam is connected with the shaft member integrally rotatably and axially slidably,
    the shaft member includes an enlarged-diameter portion,
    an elastic member that presses the cam toward a side of the cam reception portion is disposed between the enlarged-diameter portion and the cam,
    the outer cylinder is disposed across the cam reception portion and the shaft member,
    a drive-side shaft and a driven-side shaft of the drive shaft are each connected with corresponding one of the cam reception portion and the shaft member,
    the cam reception portion includes an enlarged-diameter portion that faces an end portion of the outer cylinder, and
    a sealing member and a collar member are disposed between an outer periphery of the cam reception portion and an inner peripheral surface of the outer cylinder.

\* \* \* \* \*